United States Patent [19] ... Tidwell

[11] 4,103,494
[45] Aug. 1, 1978

[54] WAVE AND TIDE MOTOR

[76] Inventor: Hubert Tidwell, Box 57, Wellington, Utah 84542

[21] Appl. No.: 790,557

[22] Filed: Apr. 25, 1977

[51] Int. Cl.² ............................................. F03G 7/00
[52] U.S. Cl. ...................................... 60/648; 60/507; 60/505
[58] Field of Search ................. 60/495, 497, 498, 501, 60/504–507; 290/53; 417/330, 331, 333

[56] References Cited

U.S. PATENT DOCUMENTS

| | | | |
|---|---|---|---|
| 899,652 | 9/1908 | Bentley et al. | 417/333 |
| 930,536 | 8/1909 | Daily | 417/333 |
| 3,126,830 | 3/1964 | Dilliner | 417/331 |

FOREIGN PATENT DOCUMENTS 529,198  11/1921  France ..................... 60/497

Primary Examiner—Allen M. Ostrager
Assistant Examiner—Stephen F. Husar
Attorney, Agent, or Firm—B. P. Fishburne, Jr.

[57] ABSTRACT

Booms are pivotally anchored to the ocean floor and have their angularity adjusted so that float operated power generating mechanisms on the booms are positioned at all times at optimum attitudes in relation to waves and the incoming or outgoing tide. The reaction faces of floats are arranged so that the resultant forces of wave and tide component forces act on the floats in an optimum direction so that the maximum usable energy can be derived by the mechanisms from the waves and tidal flows. The float operated mechanisms convert linear movements of the floats into rotational movements of shafts which can be coupled to power generating devices.

8 Claims, 6 Drawing Figures

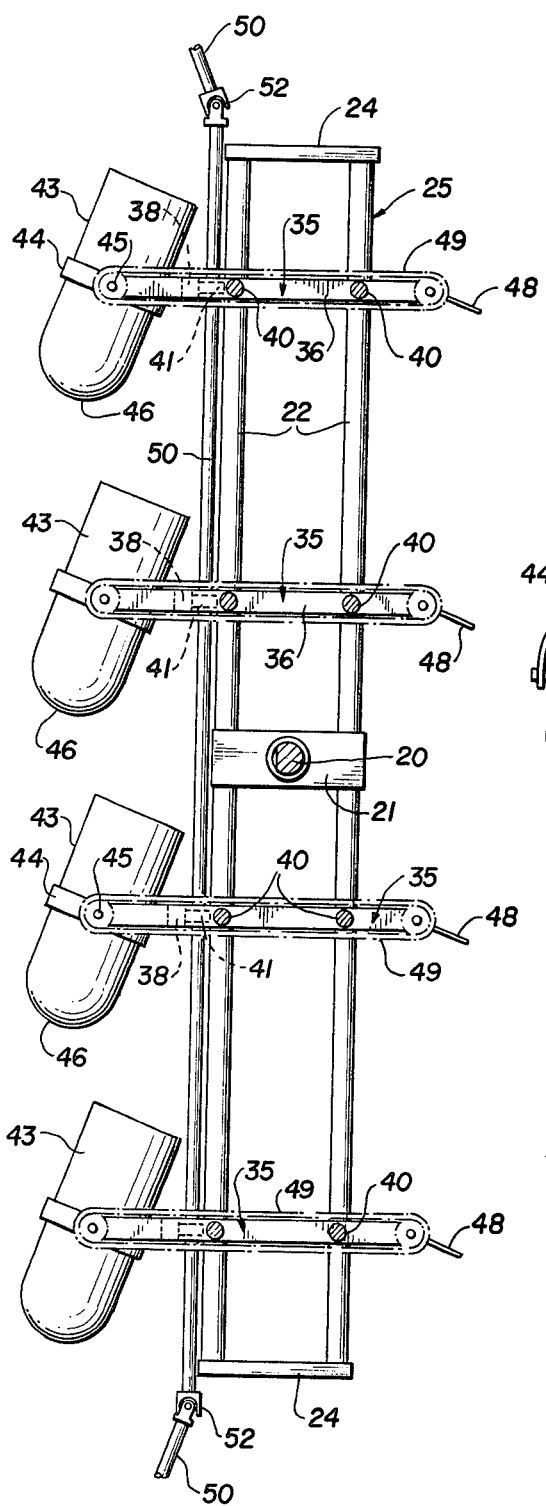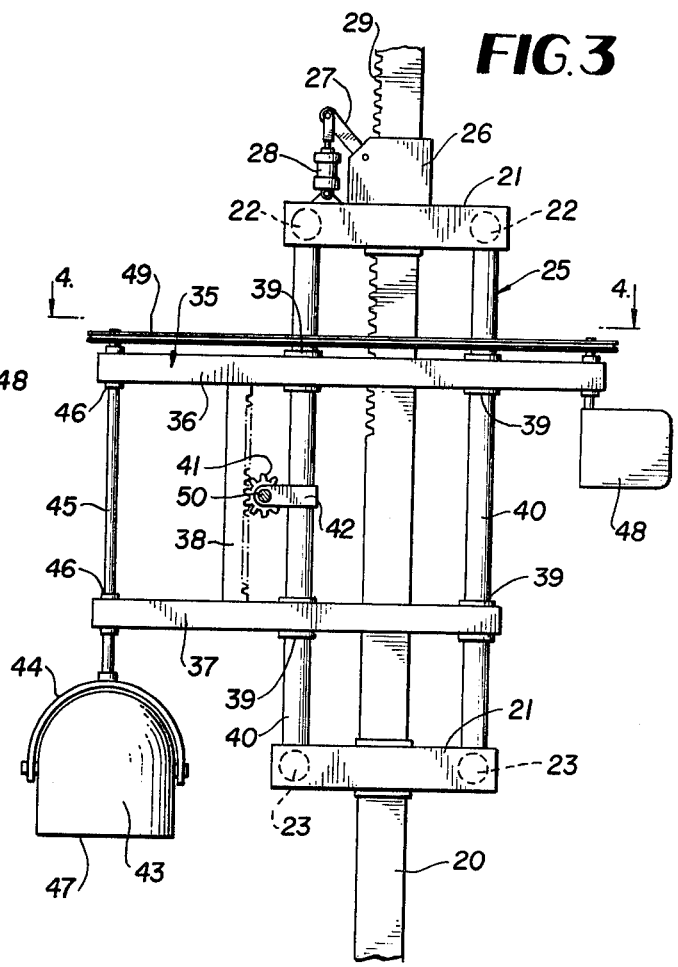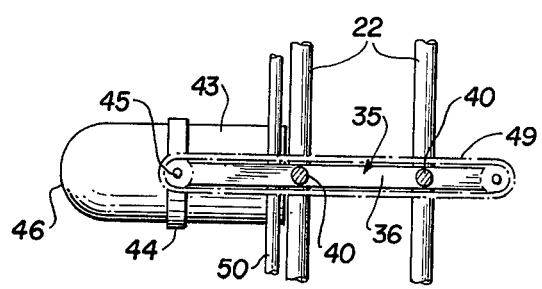

WAVE AND TIDE MOTOR

BACKGROUND OF THE INVENTION

The prior art contains numerous teachings relating to wave and tide motors which derive usable energy from the oceans. Generally, these prior art devices have not proven to be entirely practical because of the great costs necessary to construct them on a commercial scale, excessive complexity of the mechanisms and the fact that the mechanisms are fragile and tend to be damaged or destroyed in storms. A recent example of the patented prior art is shown in U.S. Pat. No. 3,922,013 to Hubert Tidwell, wherein float operated power generating mechanisms on an off-shore flotation platform having ocean bottom anchored support and guidance means are utilized.

The objective of this invention is to improve on the known prior art in terms of simplicity of construction, ruggedness of the mechanism so that it can resist destruction from natural forces, and, most particularly, in terms of the ability of the invention to derive maximum useful energy from the waves and moving tides in a unique manner and with economy.

SUMMARY OF THE INVENTION

Basically, the invention utilizes a support boom pivotally anchored to the ocean floor and having a guy guidance and stabilizing means for its upper end which projects above the water's surface. The angularity of the boom is adjusted by self-contained power means to position boom mounted float operated power mechanism at an optimum attitude relative to tidal flow and wave motion, whereby the mechanism will most efficiently utilize the maximum resultant force due to wave impingement and tidal flow reaction on a float surface which is held in an optimum position. Float motion generated by the resultant force on the float impingement surface on a linear path is converted by a simple mechanism into rotational shaft motion.

BRIEF DESCRIPTION OF THE DRAWINGS

FIG. 3 is an enlarged fragmentary elevational view of a boom and a mechanism unit adjustably mounted thereon.

FIG. 4 is a plan view of a unit of the invention as illustrated in FIG. 3.

FIG. 6 is a fragmentary plan view of the mechanism showing the float turned with its narrow tapered end facing into the tidal flow.

DETAILED DESCRIPTION

Figure 1:
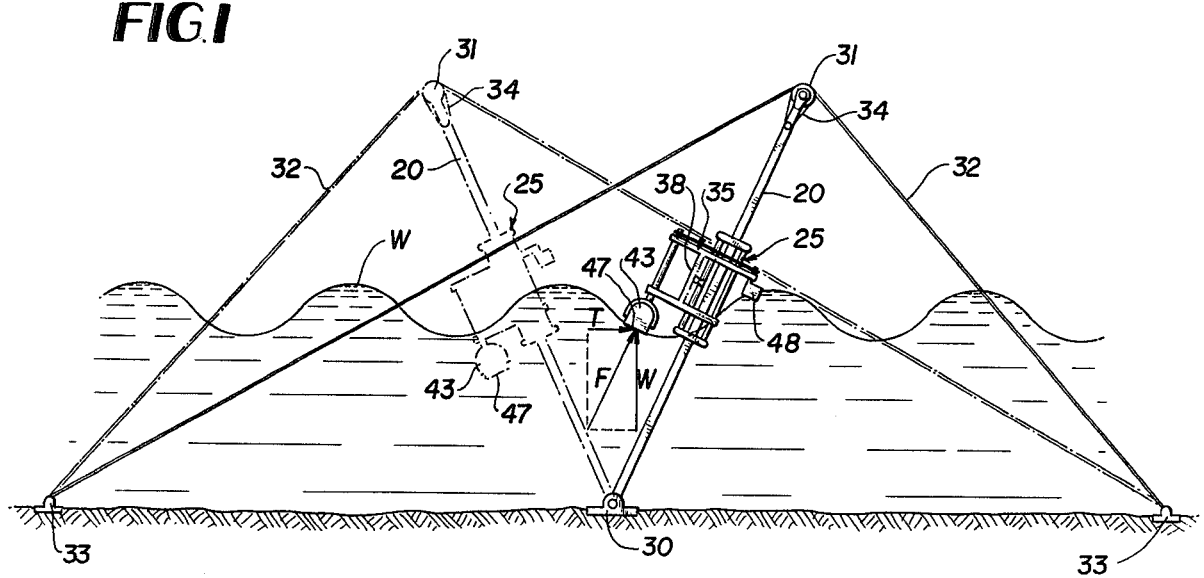
FIG. 1 is a side elevation of the invention on a partly schematic basis and illustrating the angular movability of booms on which the float operated power mechanisms are supported.
Figure 5:
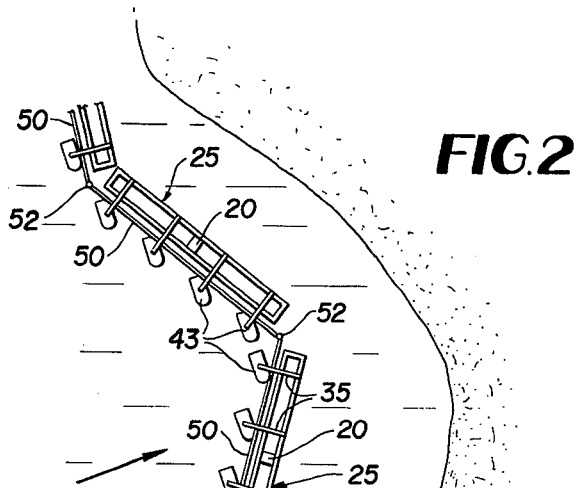
FIG. 5 is a fragmentary side elevation of the mechanism in FIG. 3.

Referring to the drawings in detail, wherein like numerals designate like parts, FIG. 4 illustrates one unit assembly of the invention which comprises a support boom 20 on which is mounted crossheads 21 of a main frame which includes upper parallel bars 22 and lower parallel bars 23. The upper and lower frame bars 22 and 23 are further cross connected at their opposite ends by braces 24 to produce a rigid structure for the main frame attached to the boom 20. While a single boom 20 for each unit of the invention is shown in the drawings, in practice, if desired, a pair of spaced booms may be utilized at each end of the main frame designated in its entirety by the numeral 25.

The main frame 25 of each invention unit is vertically adjustable on its associated support boom 20 by an upper jacking head 26 having an operating lever 27 under control of a power means 28, such as a cylinder unit. The jacking head is shiftable vertically along a toothed section 29 of the boom 20 and since the jacking head 26 is attached to the main frame 25, the entire main frame can be raised and lowered on the boom 20 which supports it.

As shown in FIG. 1, the lower end of the boom 20 is pivotally anchored to the ocean bottom by a member 30. The upper end of the boom 20 carries a sheave 31 guidingly and drivingly engaged with a cable 32 whose opposite ends are anchored at 33 to the ocean bottom. A drive motor and gearing means 34 on the boom 20 can drive the sheave 31 and swing the boom 20 to different angular positions as shown in FIG. 1 to take maximum advantage of the direction of tidal flow in the operation of the invention, as will be further described. In one position of the boom in FIG. 1, the tide is outflowing while in the second position illustrated, the tide is incoming.

Each unit of the invention further comprises on the main frame 25 a plurality, such as four, equidistantly spaced sub-frames 35, each having an upper bar 36 and a lower bar or arm 37. The bars 36 and 37 are rigidly connected by a gear rack 38 and the two bars are slidably mounted by bearings 39 on a pair of parallel guide posts 40 of each main frame 25. The tops and bottoms of the posts 40 are rigidly secured to the main frame bars 22 and 23.

A rotary gear 41 on a bracket 42 fixed to one post 40 of the main frame is in constant mesh with the adjacent gear rack 38 of each movable sub-frame 35. The gears 41 on the main frame 25 are driven by the reciprocating linear movements of the sub-frames 35 under influence of floats 43 carried by yokes 44 secured to rotatable shafts 45 journaled in bearings 46 on the arms or bars 36 and 37.

The floats 43 of each unit assembly of the invention are elongated, as illustrated, and have rounded ends 46 and flat bottom faces 47. The attitudes of the floats 43 relative to tidal flow and the waves is changeable automatically under control of a rudder 48 for each float on the upper member 36 of each sub-frame 35, the rudder being drivingly connected to the rotary shaft 45 of the float by flexible gearing 49.

By this means, the tidal flow will act on the rudder 48 to position the elongated float 43 broadside to the direction of tidal flow and the angularity of the boom 20 positions the float 43 at the optimum inclination to derive maximum energy from the tidal flow and from the impingement of waves W against the flat bottom face 47 of each float 43.

In FIG. 1, by means of vectors, the tidal and wave forces T and W are shown acting simultaneously on the lower inclined face 47 of each float. The resultant force F from the tidal and wave forces is normal to the flat face 47 and acts on each float 43 in the optimum direction to convert tidal flow and wave energy into movement of the sub-frame 35 on the boom mounted main frame 25 in the most efficient manner possible for the production of maximum energy by the invention.

Figure 2:
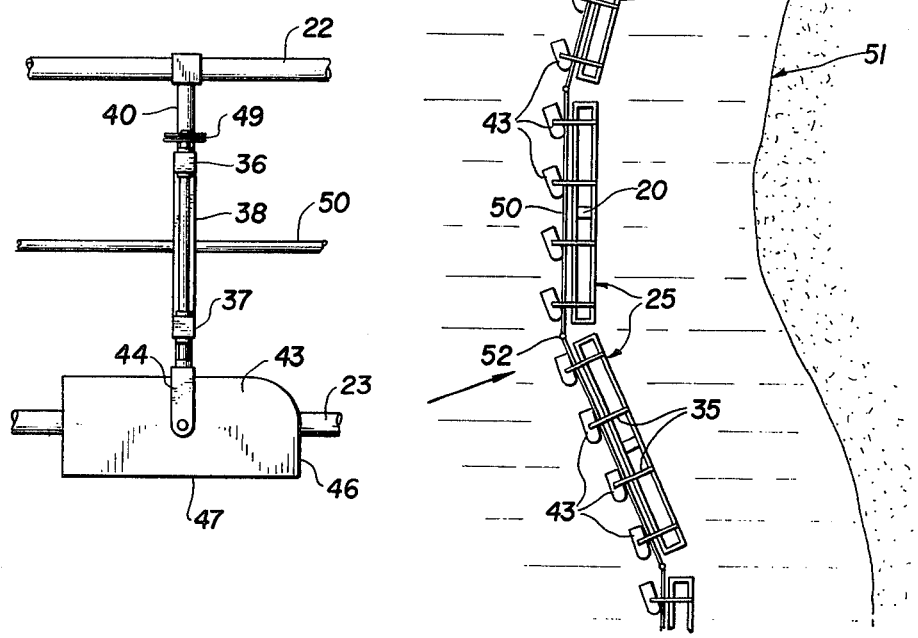
FIG. 2 is a plan view showing a multiplicity of units of the invention following the shore line in a commercially practical utilization of the invention.

It will be understood that each float 43 and its sub-frame 35 can independently rise and fall on the main frame 25 of each invention unit. The sub-frame 35 is driven upwardly by the resultant force F and descends on the main frame by gravity. During each such reciprocation, the several gears 41 are driven to impart rotation to a common rotary shaft 50 with which they are coupled through conventional one-way active and one-way free wheeling clutches as described in U.S. Pat. No. 3,922,013. In this simple manner, the rising and falling of the sub-frames 35 on the guide posts 40 of the main frame 25 will cause continuous rotation of the shaft 50 which, through other like shafts of a complete system along a shore line, as shown in FIG. 2, will drive electrical generating equipment, not shown, to thus produce useful power from the combined forces of tidal flow inwardly or outwardly and wave action. As already explained, the angularity of the boom 20 is changed between the two positions shown in FIG. 1 to allow the invention to operate most effectively when the tide is incoming or outgoing.

FIG. 2 of the drawings shows a practical embodiment of the invention constructed along a shore line 51 of irregular contour. Plural invention units having the above-described boom mounted main frames 25 generally parallel the shore line 51 and the rotary shafts 50 of each unit are coupled through universal joints 52. In this manner, the system can be constructed off-shore along practically any ocean shore line, as will be appreciated. When violent storms are encountered, the units of the invention can be safely elevated on the booms 20 above the waves or submerged well below the surface of the water by the powered jacking means 26. Also, in severe conditions, as illustrated in FIG. 6, the elongated floats 43 can be rotated so that their rounded ends face frontally into the tide and surf and therefore offer decreased resistance to forces impinging on them. It will be understood, however, that under normal circumstances, the floats of each unit are parallel and face broadside into the surf and tidal flow and are inclined for optimum utilization of the flat bottom impingement surface 47 of each float. The rudders 48 reacting with the tide keep the floats 43 in their optimum positions relative to the tide as shown in FIG. 4. As previously explained, the booms 20 are adjusted to impart to the float surfaces 47 the most efficient angle for deriving maximum energy from the waves and from tidal flow. The arrangement is such that the resultant force F acting on the surface 47 delivers to the floats the greatest possible usable energy from tidal flow and wave action, regardless of whether the tide is coming in or going out. The rising and falling of the floats 43 produce rotation of the shafting 50 to generate electrical power, as previously explained.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A wave and tide motor comprising a support boom, means to pivotally anchor one end of said boom to the ocean bottom, whereby the boom can be adjusted angularly on its pivot axis in relation to incoming or outgoing tidal flow, a main frame on said boom, a sub-frame movably mounted on the main frame, a float carried by the sub-frame and adapted to respond to impingement forces on the float due to tidal flow and wave action whereby a resultant impingement force on the float will move the sub-frame in one direction along the main frame, the sub-frame moving in the opposite direction along the main frame under the influence of gravity, and coating means on the main frame and sub-frame for converting linear reciprocation of the sub-frame into rotational movement of a shaft.

2. A wave and tide motor as defined in claim 1, and said float being pivotally mounted on the sub-frame, and rudder means drivingly coupled with the float and responding to tidal flow to keep the broadside of the float facing into the direction of tidal flow.

3. A wave and tide motor as defined in claim 1, and said coacting means including a gear rack on the sub-frame and a rotary gear on the main frame in mesh with the gear rack, said rotary gear coupled with a rotational shaft.

4. A wave and tide motor as defined in claim 1, and said main frame being adjustably mounted on said boom, and means on said boom and main frame to shift the main frame lengthwise of the boom and lock the main frame in selected adjusted positions.

5. A wave and tide motor as defined in claim 4, and said means comprising a power jacking means.

6. A wave and tide motor as defined in claim 1, and said main frame extending across said boom and being elongated, a plurality of sub-frames movably mounted on the main frame, and one float carried by each sub-frame.

7. A wave and tide motor as defined in claim 1, and said float being elongated and having a substantially flat bottom reaction face for arrangement with said boom at an optimum angle relative to tidal flow to enable the float to derive optimum energy from tidal flow and wave action and to utilize such energy for moving the sub-frame on said main frame.

8. A wave and tide motor as defined in claim 1, and power operated positioning and guidance means connected with said boom to change the angularity of the boom.

* * * * *